US012790997B1

(12) United States Patent
Gilham et al.

(10) Patent No.: US 12,790,997 B1
(45) Date of Patent: Nov. 10, 2026

(54) METERING ROD WITH ACCELERATOR FUEL DELIVERY

(71) Applicant: Lectron Worldwide, LLC, Andover, KS (US)

(72) Inventors: Kevin Gilham, Fort Collins, CO (US); Matthew Denecke, San Antonio, TX (US)

(73) Assignee: LECTRON WORLDWIDE, LLC, Andover, KS (US)

( * ) Notice: Subject to any disclaimer, the term of this patent is extended or adjusted under 35 U.S.C. 154(b) by 0 days.

(21) Appl. No.: 18/893,767

(22) Filed: Sep. 23, 2024

Related U.S. Application Data

(60) Provisional application No. 63/584,601, filed on Sep. 22, 2023.

(51) Int. Cl.
*F02M 19/04* (2006.01)

(52) U.S. Cl.
CPC .................................. *F02M 19/04* (2013.01)

(58) Field of Classification Search
CPC .................................................... F02M 19/04
USPC .................................................... 261/66, 70
See application file for complete search history.

(56) References Cited

U.S. PATENT DOCUMENTS 3,520,520 A * 7/1970 Cheskey ................ F02M 17/02 261/51
3,851,021 A * 11/1974 Moulds .................... F02M 7/22 261/DIG. 38
3,985,839 A * 10/1976 Edmonston ............ F02M 19/04 261/DIG. 38
4,013,741 A * 3/1977 Edmonston .............. F02M 9/06 251/903
4,221,747 A * 9/1980 Edmonston ............ F02M 1/043 261/DIG. 38
RE31,475 E * 12/1983 Edmonston .............. F02M 9/06 261/44.3
5,300,259 A * 4/1994 Tashiro .................. F02M 61/16 261/DIG. 39
8,616,179 B2 * 12/2013 Quantz ..................... F02D 9/16 123/337
10,371,100 B2 * 8/2019 Dyess ...................... F02M 7/18
2001/0048168 A1 * 12/2001 Kahlhamer ............ F02M 19/04 261/DIG. 38
2011/0120414 A1 * 5/2011 Quantz .................. F02M 9/085 261/44.8
2013/0206107 A1 * 8/2013 Dyess .................... F02M 19/04 261/36.2
2014/0007840 A1 * 1/2014 Cleeves ................... F02M 7/24 123/438

FOREIGN PATENT DOCUMENTS

DE 843761 * 7/1952
DE 849319 * 9/1952
FR 505169 * 11/1921

* cited by examiner

*Primary Examiner* — Charles S Bushey

(57) ABSTRACT

A metering rod with accelerator fuel delivery circuit for providing fuel delivery during a sudden low vacuum demand in a carburetor, throttle body, or other fuel delivery device for an internal combustion engine. The metering rod with accelerator fuel delivery generally includes the addition of a top slot, a reservoir, and a bottom slot, of varied depth for transient, intermittent fuel delivery on the opposing side of a flat sided semi-cylindrical metering rod.

6 Claims, 8 Drawing Sheets

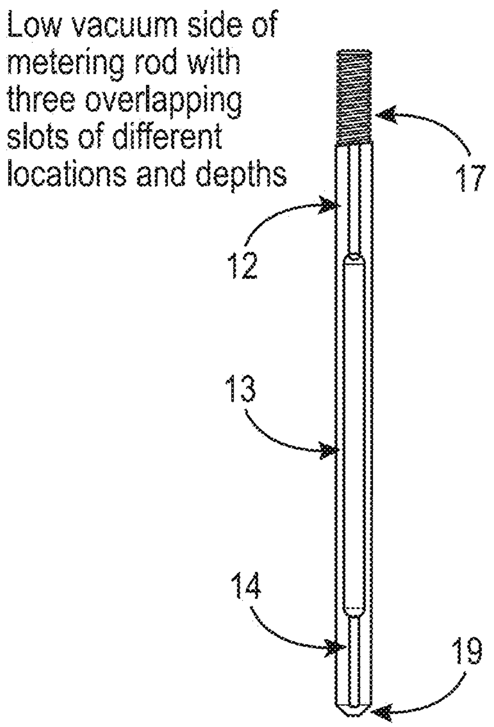
FIG. 3.1
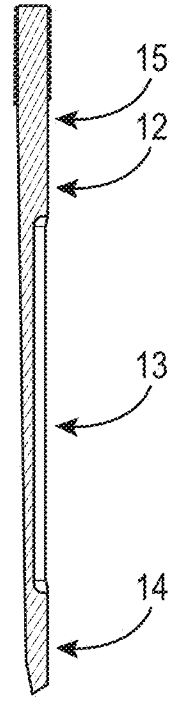
FIG. 3.2

METERING ROD WITH ACCELERATOR FUEL DELIVERY

CROSS-REFERENCE TO RELATED APPLICATIONS

This nonprovisional US Patent Application hereby claims priority to U.S. Provisional Patent Application, Ser. No. 63/584,601, filed Sep. 22, 2023, entitled METERING ROD WITH ACCELERATOR FUEL DELIVERY, in the name of Gilham et al, the entire contents of which are incorporated herein for all purposes.

BACKGROUND

Known exemplary embodiments of metering rods for use in a fuel delivery system in general relate to and incorporate vacuum dependent fuel deliveries. More specifically, these known metering rods and fuel systems including a metering rod lack features for accelerated fuel delivery during a sudden low vacuum demand in a carburetor, throttle body, or other fuel delivery device for an internal combustion engine. Due to the shortcomings of these known systems and metering rods, there remains a long and unending need for more improved fuel delivery, partially independent of engine vacuum, to provide increased performance during a variety of operating conditions.

SUMMARY

An exemplary embodiment of the present disclosure is directed to a transient, low vacuum fuel delivery metering rod and design including a first or top slot, a reservoir, and a second or bottom slot, wherein the bottom slot includes a varied depth for providing transient, intermittent fuel delivery on the opposing side of (i.e., the leading side or the up-stream side and opposite the flat side of the metering rod) from a flat sided semi-cylindrical metering rod.

There is thus outlined, rather broadly, some of the features of an improved performance metering rod including accelerator fuel delivery as set forth below in the detailed description in order that the present contribution to the art may be better appreciated by one of ordinary skill in the relevant art. There may be additional features of the metering rod with accelerator fuel delivery that will be described hereinafter. In this respect, before explaining at least one embodiment of the metering rod with accelerator fuel delivery in detail, it is to be understood that the metering rod with accelerator fuel delivery is not limited in its application to the details of construction or to the arrangements of the components set forth in the following detailed description, nor is it limited to the embodiments illustrated in the drawings. The metering rod with accelerator fuel delivery of the present disclosure is capable of other embodiments and of being practiced and conducted in various alternative ways that will be understood by one of ordinary skill in the art after understanding the present disclosure. Also, it is to be understood that the phraseology and terminology employed herein are for the purpose of the present detailed description and should not be regarded as limiting.

In one embodiment of the present disclosure there is disclosed a metering rod having an accelerator fuel delivery feature for providing improved fuel delivery performance a variety of conditions including during a sudden low vacuum demand in a carburetor, throttle body, or other fuel delivery device for an internal combustion engine.

In one embodiment of the present disclosure there is disclosed a metering rod having an accelerator fuel delivery circuit that can deliver fuel in a way that a traditional throttle body or carburetor cannot achieve without using a mechanical fuel pump.

In one embodiment of the present disclosure there is disclosed a metering rod having an accelerator fuel delivery feature that may instantaneously deliver fuel in direct response to a change in throttle position in a carburetor or throttle body that is both dependent on the change in throttle position and the rate of change in throttle position.

In one embodiment of the present disclosure there is disclosed a metering rod having an accelerator fuel delivery feature that may instantaneously deliver fuel in direct response to transient engine load where there is a drop in engine vacuum in the fuel delivery device.

In one embodiment of the present disclosure there is disclosed a metering rod having an accelerator fuel delivery circuit that may contain one or more vertical slots each having one or more depths, heights, or locations, on the low-vacuum side of the metering rod or primary fuel delivery device with the purpose of improving fuel delivery performance, including delivering additional fuel, to the internal combustion engine.

In one embodiment of the present disclosure there is disclosed a metering rod having an accelerator fuel delivery circuit that may include one or more internal holes of one or more sizes and locations for the purpose of improving the transient fuel delivery performance of the fuel system.

In one embodiment of the present disclosure there is disclosed a metering rod having an accelerator fuel delivery circuit that may use one of the aforementioned vertical slots or internal holes as the primary fuel delivery structure and method for idle or near idle conditions.

In one embodiment of the present disclosure there is disclosed a metering rod having an accelerator fuel delivery circuit that may use one or more of the aforementioned vertical slots or internal holes as a cavity to cause fuel to lift from one part of the fuel delivery device to another, independent of vacuum pressure.

In one embodiment of the present disclosure there is disclosed a metering rod having an accelerator fuel delivery circuit that may use one or more of the aforementioned vertical slots or internal holes as a reservoir to store fuel to be ready for instantaneous delivery upon throttle opening.

In one embodiment of the present disclosure there is disclosed a metering rod having an accelerator fuel delivery circuit that may use one or more of the aforementioned vertical slots or internal holes as an orifice to apply a vacuum to store fuel in the reservoir formed by another vertical slot of the same or different size.

In one embodiment of the present disclosure there is disclosed a metering rod with additional features and functions, including slots or holes that provide improved fuel delivery that may improve fuel delivery under steady state and non-steady state conditions.

Other objects and advantages of the various embodiments of the present disclosure will become obvious after reading this detailed description and it is intended that these objects and advantages are within the scope of the present disclosure. To the accomplishment of the above and related objects, the detailed disclosure may be embodied in the forms illustrated in the accompanying drawings, attention being called to the fact, however, that the detailed disclosure and drawings are illustrative only, and that changes may be made in the specific construction illustrated and described within the scope of this application.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 3.1 is a frontal view of a metering rod with accelerator fuel delivery feature according to the present disclosure and illustrating the relative positions of the different slots on a low vacuum side of the metering rod wherein a top slot serves to use engine pressure to fill a cavity and to deliver fuel at idle, a reservoir serves as a storage cavity that delivers fuel when opening the throttle quickly, and a bottom slot controls fuel flow in and out of the reservoir.

FIG. 3.2 is a cross-sectional side view of the a metering rod with an accelerator fuel delivery feature according to the present disclosure and illustrating the relative positions of the different slots on a low vacuum side of the metering rod wherein a top slot serves to use engine pressure to fill a cavity and to deliver fuel at idle, a reservoir serves as a storage cavity that delivers fuel when opening the throttle quickly, and a bottom slot controls fuel flow in and out of the reservoir.

DETAILED DESCRIPTION

A. Overview

Figure 1:
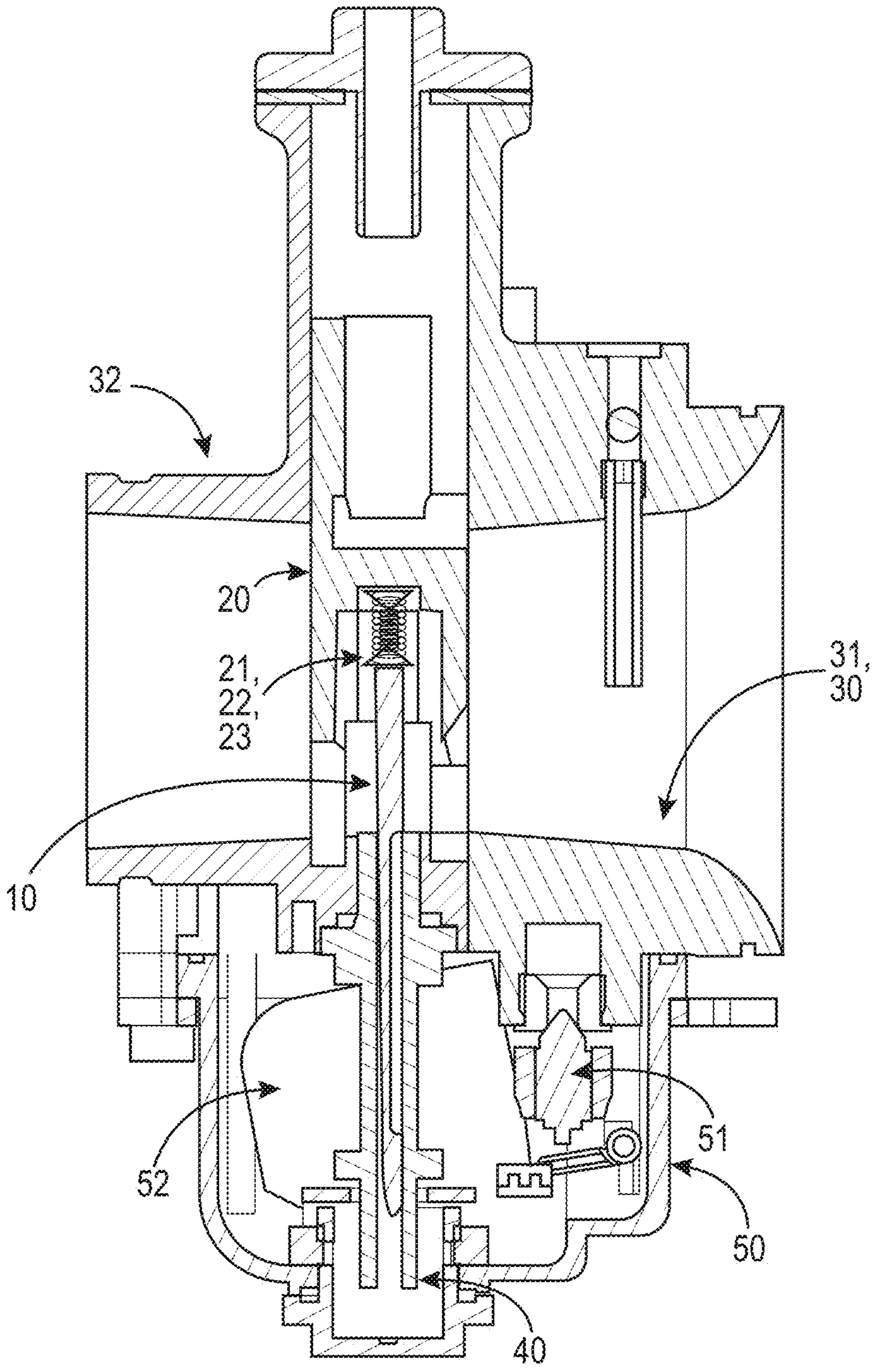
FIG. 1 is an exploded, cross-section, side view of a carburetor including a metering rod feature according to the present disclosure. The illustration provides a representation of the relative position of the metering rod including an accelerator fuel delivery feature within a carburetor.

Turning now descriptively to the drawings, in which similar reference characters denote similar elements throughout the several views, the figures illustrate exemplary embodiments of a metering rod for use in a fuel deliver system wherein the metering rod includes a top slot, a reservoir, and a bottom slot, having a varied depth for transient, intermittent fuel delivery on the opposing side of a flat sided semi-cylindrical (D-shaped cross-section) metering rod.

B. Metering Rod With Accelerator Circuit

Figure 2:
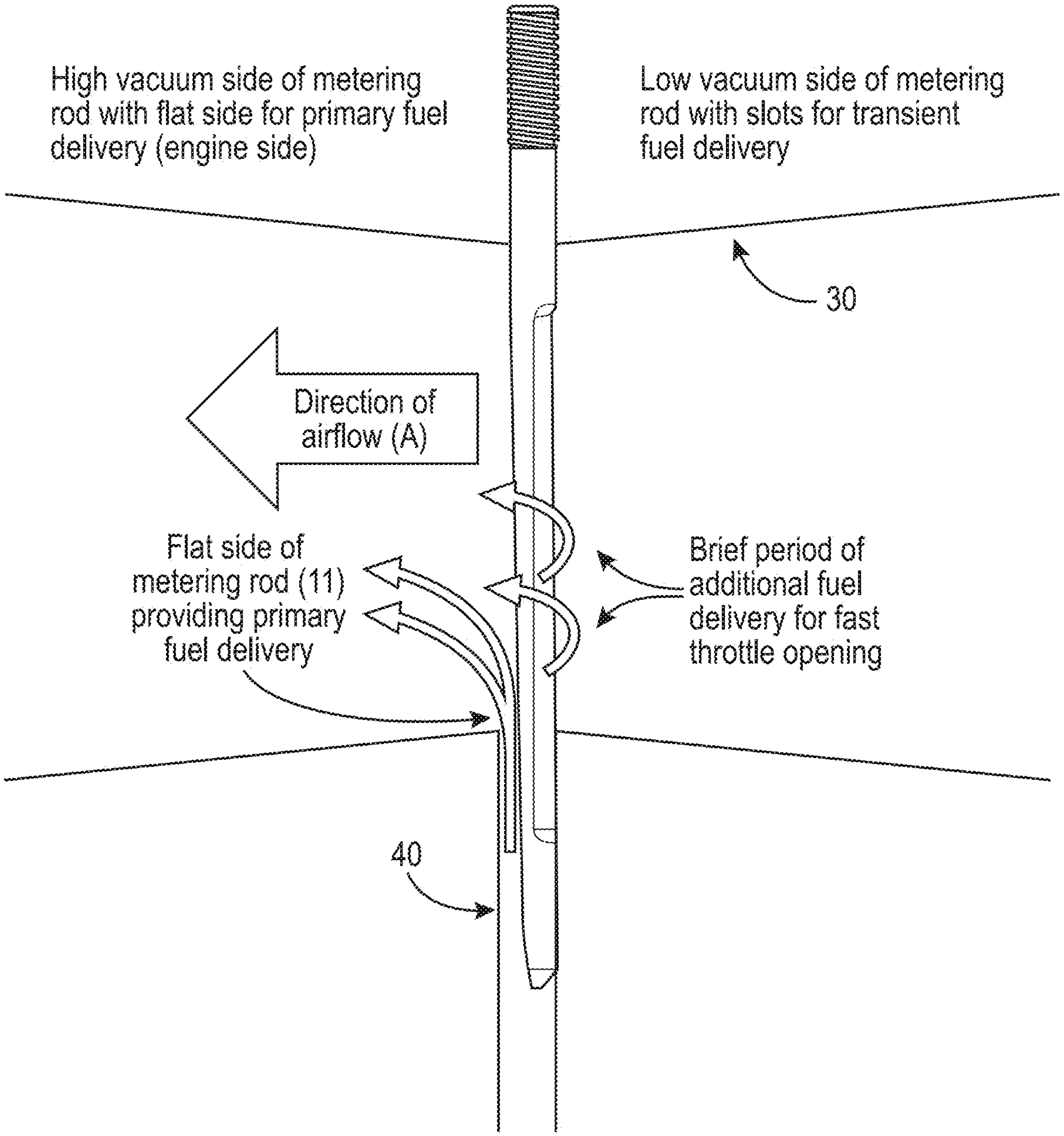
FIG. 2 is a partial, side view of a metering rod with an accelerator fuel delivery feature according to the present disclosure and illustrating the positioning of slots for providing improved transient fuel delivery relative to the direction of air flow and relative to a primary fuel delivery surface.

Referring generally to all of the Figures, and in particular for FIGS. 1-3.2, a metering rod (10) consists of a (D-shaped cross-section) semi-cylindrical metal rod (15) for providing improved fuel delivery as part of a fuel delivery system (e.g., carburetor, throttle body, etc.) to an internal combustion engine (not shown). The primary source of fuel delivery is a flat surface (11) and may include a taper such that the taper is of greater depth at a tip (19), that is on the downstream side of the metering rod (10) relative to the direction of airflow (as shown by the arrow A). A novel addition to the metering rod is an accelerator circuit (12, 13, 14). The accelerator circuit may broadly include a top slot (12), a centrally located reservoir (13), and a bottom slot (14).

Figure 4:
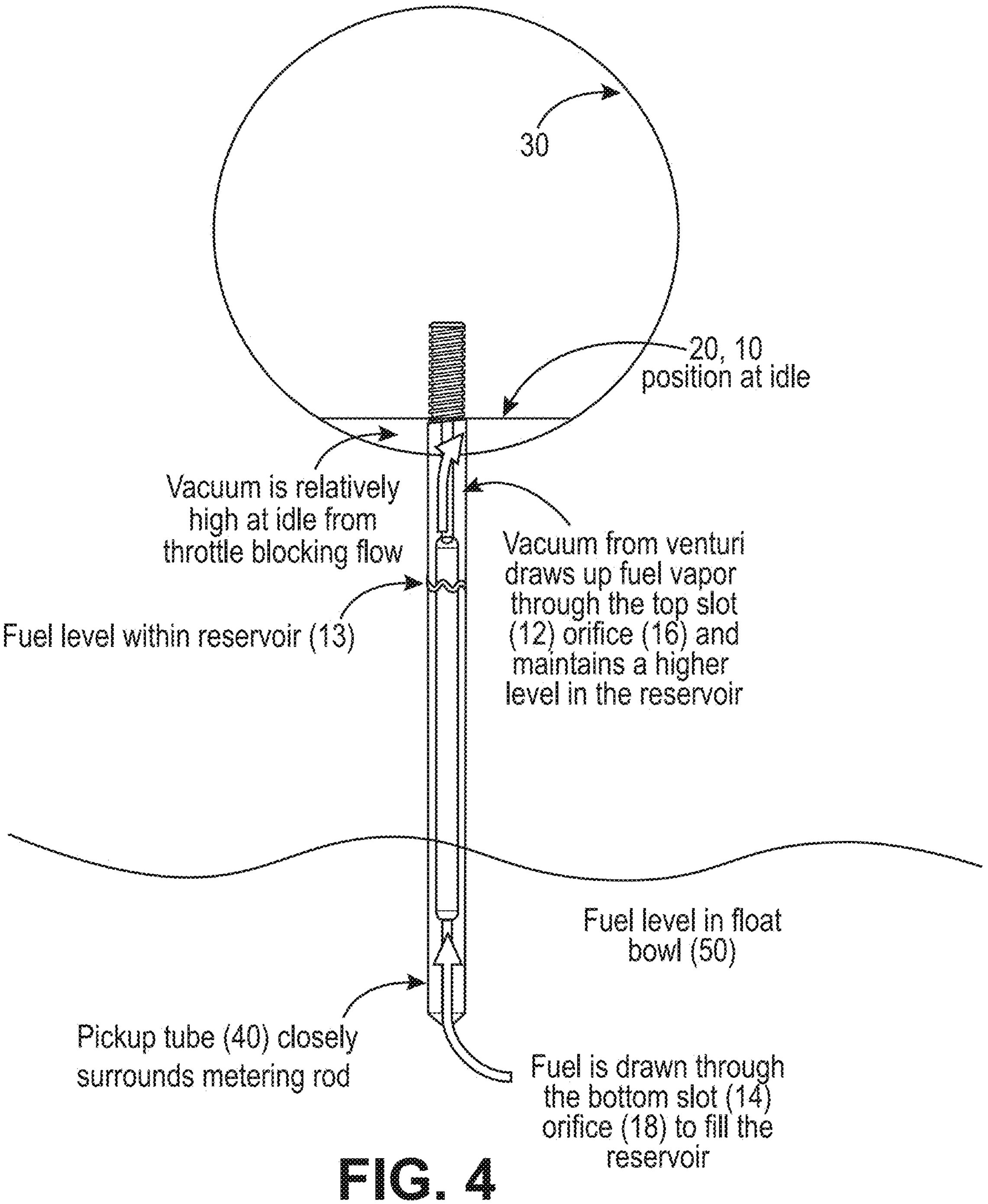
FIG. 4 is a graphical illustration detailing sub-operations of a metering rod of the present disclosure. The illustration includes a fuel flow at idle wherein fuel is drawn through a bottom slot to fill a larger middle slot that serves as a storage reservoir. A top slot acts as an orifice through which the engine vacuum draws fuel vapor that contributes to the overall idle air to fuel ratio (AFR) while simultaneously maintaining a higher level of fuel in the reservoir than gravity would otherwise allow.
Figure 8:
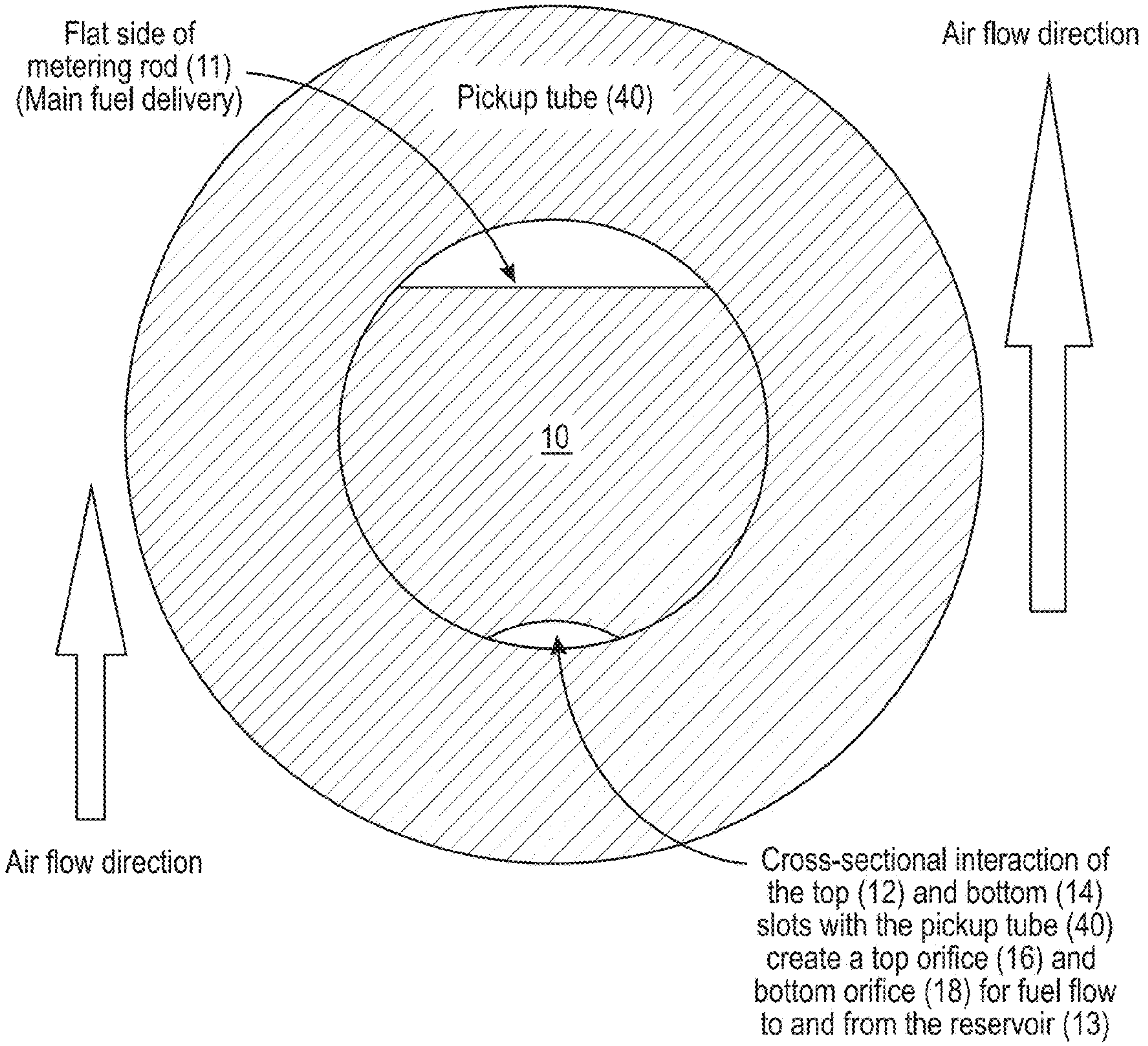
FIG. 8 is a horizontal cross section of a metering rod and pickup tube according to the present disclosure. The illustration includes a representation of the cross-sectional interaction of the top and bottom slots with the pickup tube to create a top orifice and bottom orifice (18) for fuel flow to and from the reservoir.

The top slot (12) serves as an orifice (16), as best shown in FIG. 8, to connect the reservoir slot (13) below it to a venturi (30) above it when the engine is being operated at idle. Idle is a condition wherein a throttle slide (20) at its lowest position as best shown in FIG. 4 and the lowest desirable engine operating speed. When the engine operates at idle, the orifice (16) communicates engine vacuum to maintain a larger amount of fuel in the reservoir (13), as well as deliver a small amount of fuel at idle, relative to the flat tapered side (11) of the metering rod (10). The top slot (12) consists of an axially milled groove having one end located proximally to a threaded end (17) of the metering rod (10) and having an approximately 0.008" depth in one particular embodiment. Most preferably, the bottom slot (12) is directly opposite to the flat side (11) of the metering rod (10), but it may be radially offset by as much as 45 degrees and still be effective.

The reservoir (13) holds fuel directly below the venturi (30), then lifts or transfers the fuel to the venturi (30) during immediate throttle (20) openings providing for a richer AFR at low (near idle) RPM, high (at or near fully open) throttle position situations that otherwise wouldn't be possible without the use of an expensive and heavy mechanical pump. The accelerator circuit (12, 13, 14) includes an axially milled groove or slot (13) in approximately the middle half of the operational length of the metering rod (10), of most preferably half the diameter of the metering rod (10) in depth but may also be as deep as can be fit within the physical constraints of the metering rod, or as shallow as the bottom slot (14). Most preferably, it is directly radially opposite the flat side (11) of the metering rod (10), but it may be radially offset by as much as 45 degrees and still be effective.

The bottom slot (14) serves as an orifice (18) to connect the reservoir slot (13) above, to the float bowl (50) below, as best shown in FIGS. 4 and 8. The orifice (18) affects the rate of fuel flow in and out of the reservoir (13), and therefore the sensitivity of the fuel accelerator circuit (12, 13, 14) as a whole. The orifice (18) and the reservoir (13) are most preferably designed to vary the rate of fuel flow directly proportional to the rate of change of the opening and closing of the throttle (20), as best shown in FIGS. 4-7. The bottom slot (14) includes an axially milled groove near the tip (19) of the metering rod (10), and approximately 0.008" deep. Most preferably, it is directly radially opposite to the flat side (11) of the metering rod (10), but it may be radially offset by as much as 45 degrees and still be effective.

Referring in particular to FIGS. 3.1 and 3.2, a metering rod (10) including a substantially semi-cylindrical rod with which one side may be most preferably ground but may also be manufactured using any other known or appropriate method for producing a flat tapered surface (milled, lapped, forged, casted, etc.). Additionally, it includes a threaded top (17), a flat taper ground into one side (11), along the length of the metering rod (10) for primary fuel, and the addition of an accelerator circuit (12, 13, 14) for temporary enrichment. The accelerator circuit delivers up to 25% more fuel for brief periods when the throttle (20) goes from near fully closed to near fully open in less than approximately a second. The accelerator circuit (12, 13, 14) includes a combination of three slots, most preferably milled, but may also be manufactured using any other known or appropriate method for producing slot or groove (ground, lapped, forged, casted, etc.), axially, preferably along the centerline of the metering rod (10) and, most preferably, directly opposite of the flat tapered face (11).

In one particular embodiment of the present disclosure, as shown in FIGS. 3.1, and 3.2, the top slot (12) is preferably milled with a 5/64" ball nose end mill at a depth of approximately 0.001-0.009" depending on the application, from the top of the Reservoir (13) to the first thread at the base of the metering rod (17). On some models the top slot is not necessary. The second slot, or reservoir (13), is a slot milled with a 5/64" ball nose end mill at a depth of approximately 0.040-0.060" depending on the application, from approximately 20% of wide-open throttle to 120% of wide-open throttle depending on the application. The third slot, or the bottom slot is a slot (14), milled with a 5/64" ball nose end mill at a depth of approximately 0.005-0.009" depending on the application, from the bottom of the Reservoir to tip of the metering rod.

A flat sided metering rod, preferably of a generally round or generally D-shaped cross section, may preferably include, radially opposite of the flat tapered side (11) of the metering rod (10), one or more slots (12, 13, 14) having any cross-sectional shape (ball-nose, flat, V-shaped, etc.), with any size of tooling, or method of manufacture (metal removal (including milling, grinding, splining, etc.), additive manufacturing, forging, casting, etc.), in any position, axially or radially, on the metering rod, with the intended purpose of intermittent supplementary fuel delivery to a flat side (11) of the metering rod (10).

C. Throttle Slide

Referring now in particular for FIGS. 1, 4, 5, 6, and 7, the throttle slide (20) consists broadly of a guillotine style slide (20) that the metering rod (10) is threaded into a bottom (22) thereof. The amount of thread engagement of the rod (10) into the slide (20) can be used to adjust fuel delivery. The throttle slide (20) is attached to a throttle cable (not shown) that moves it against a spring (not shown) within the carburetor venturi to restrict and control air flow to the engine. The slide (20) also moves the metering rod (10) within the pickup tube (40), regulating fuel flow to match the relative air flow.

A guillotine style slide 20 may have an "H" or "T" shape cross section #that may include a threaded insert (21) on the bottom (22) that allows for the metering rod (10) to be coupled thereto by a threaded connection and may be adjusted by varying amounts to change the fuel delivery of from the flat side of the metering rod (11) and the overall performance thereof. The threaded insert (21) may include a spring (22) including notches that allow the metering rod (10) to be adjusted in finer increments than 1 turn.

The disclosure is also effective in carburetors, throttle bodies, or other fuel delivery devices with any variation of guillotine style slide, butterfly valve, rotary valve, or Constant velocity ("CV") diaphragm type throttle body.

D. Carburetor Venturi

The main body of the carburetor contains a primary hole through which air flows and is accelerated according to Bernoulli's Principle. The change in cross sectional flow areas creates a low-pressure zone in the air flow that picks up fuel through the pickup tube (40) and encourages atomization.

The venturi consists of a tapered hole that is bored through the main body of the carburetor. This taper reaches its narrowest cross-sectional area at its intersection with the throttle slide. On the inlet side of the venturi is a bell-mouth that bridges the size between the carb taper and the airbox size of the vehicle.

The disclosure is also effective in carburetors, throttle bodies, or other fuel delivery devices that utilize a differential in pressure for primary fuel delivery.

E. Pickup Tube

The pickup tube (40) closely encapsulates the metering rod from its intersection point with the venturi to the float bowl. The void area between the flat side of the metering rod and the inner diameter of the pickup tube (40) serves as the primary fuel metering orifice of the carburetor. The inner surface of the pickup tube (40) also encapsulates the slots and reservoir of the fuel accelerator circuit on the rod (10).

The pickup tube (40) may be a simple metal tube, sealed to the body of the carburetor to prevent leaks in vacuum. Preferably, the pickup tube (40) is flush with the inside of the venturi (30) on its top and extends into the fuel level within the float bowl (50) at its bottom. It is machined to a very tight tolerance to the metering rod (10) such that the metering rod (10) may move freely with no binding, and with minimal leakage or clearance between the metering rod (10) and the inside of the pickup tube (40).

It should be understood that the present disclosure and its teachings may also be made effective in carburetors, throttle bodies, or other fuel delivery devices that utilize a flat sided metering rod (10) for primary fuel delivery.

F. Float Bowl

It is known that a carburetor may include a storage reservoir float bowl (50) located proximal the bottom of the carburetor and including an enclosed float bowl (50) vented to the atmosphere. The float bowl (50) preferably ensures a constant level of fuel for the pickup tube (40) to draw from. This may be achieved by use of a buoyant material float (52) attached to one end of the float lever and floating in the fuel in the float bowl (50) and wherein the lever may include a second having a float needle valve (51). As the fuel level increases, the additional buoyant force of the float (52) applies pressure to the float needle valve (51) thereby moving the float needle valve (51) closer to the fuel inlet and further restricting the flow of fuel into the float bowl (50) thereby maintaining a relatively constant fuel level in the bowl (50).

The disclosure is applicable within fuel delivery devices that include no float bowl at all, including but not limited to, diaphragm reservoir carburetors (e.g., McCulloch carburetors), as well as fuel pump assisted float bowls.

G. Connections of Main Elements and Sub-Elements of Disclosure

The metering rod (10) contains the top slot, reservoir, and bottom slot on the side directly opposing the flat tapered side. The slots intersect in series such that fuel can flow in one path between the float bowl and the venturi. The metering rod is threaded into the bottom of the slide which moves up and down, normal to the direction of air flow through the venturi. The venturi is roughly in the center of the carburetor, vertically and longitudinally. The float bowl is directly below the venturi at the bottom of the carburetor. Within the float bowl is the float, which operates around a pivot extending from the carb body, and a float needle, which rests on the float and within an orifice that it blocks.

H. Alternative Embodiments of Disclosure

For use as supplementary fuel delivery in a throttle body or other fuel metering device.

For use in supplementary fuel delivery in a conventionally jetted carburetor without a flat side metering rod.

Any variation or combination of holes or slots, internally or externally between the tip, flat side (high vacuum side), or low vacuum side of a metering with the intended purpose of supplementing fuel delivery are possible, including, in particular, on a flat side of a metering rod.

Any method of temporarily enriching the AFR in a flat side metering rod (10) for high load scenarios. This includes but is not limited to slots, scoops, ridges, or holes on either side of a flat sided metering rod.

I. Operation of Preferred Embodiment

The metering rod (10) with optimized accelerator fuel delivery operates as would a traditional metering rod, with supplemental fuel delivery being contributed by the accelerator circuit (11, 12, 13) for brief periods, directly following intermediate or fast throttle (20) openings.

The amount of vacuum within a fuel delivery or metering device increases with engine speed (i.e., engine RPMs) and decreases when the engine speed decreases (i.e., it generally varies with throttle position). Therefore, the situation where the engine is at idle has the highest load on the engine and at the same time has the smallest amount of vacuum within the fuel metering device. Since normal carburetors and throttle bodies deliver fuel based off engine vacuum, they will experience a leaner (higher) Air-Fuel Ratio (AFR), in the situation where they would ideally have a richer (lower) AFR. Any normal attempt of richening low RPM AFR at larger throttle positions will cause subsequent over-fueling at higher RPM where the engine is generating sufficient vacuum to efficiently draw fuel at that throttle position. This disclosure effectively circumvents these limitations with no additional moving parts or traditional mechanical pumps (i.e., accelerator pumps).

At idle, fuel is drawn through the bottom slot (14) to fill the larger middle slot that serves as a storage reservoir (13). The top slot (12) acts as an orifice through which the engine vacuum draws fuel vapor that makes up some contribution to the overall idle AFR, while simultaneously maintaining a higher level in the reservoir than gravity would otherwise allow. By maintaining this higher level, a larger volume of available fuel is able to be stored, and in closer proximity to the venturi (30), creating more instantaneous response (FIG. 4). On some models of bike, the top slot is not necessary, and the engine creates sufficient vacuum to fill the reservoir from the clearance between the rod (10) and pickup tube (40).

Figure 5:
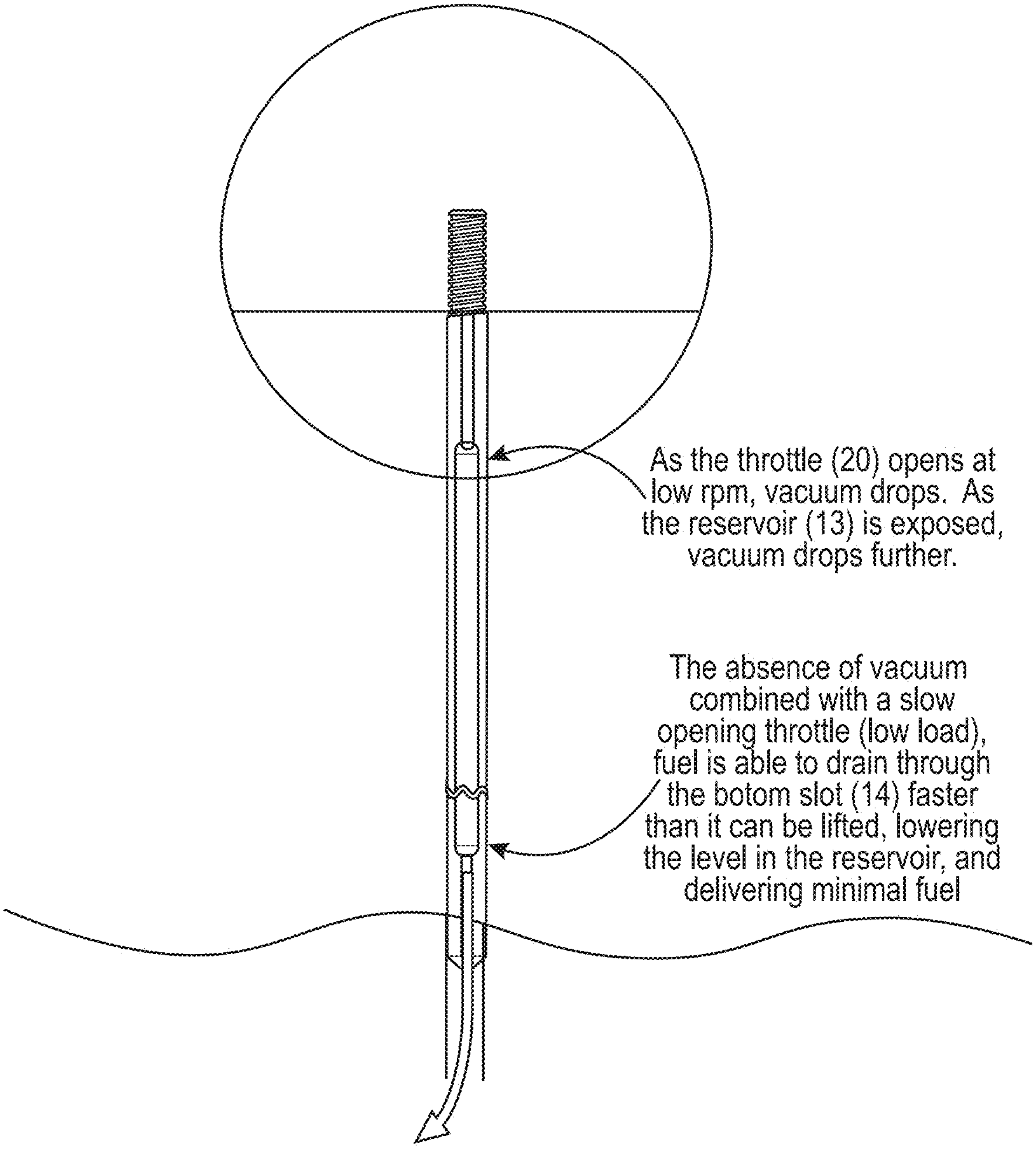
FIG. 5 is a graphical illustration further detailing sub-operations of a metering rod of the present disclosure. The illustration includes a representation of fuel delivery during a relatively light load or constant throttle operation. As a throttle is slowly opened, such as when pulling away from a stop light, fuel drains through a bottom slot faster than it is physically lifted by the upward motion of the bottom of the reservoir. As a result, the reservoir contributes minimally to the overall AFR allowing the flat tapered side of the metering rod to be the sole delivery source of fuel.

As shown in FIG. 5, as the throttle opens at low RPM, the vacuum pulled by the engine drops. Once the reservoir (13) is exposed, the vacuum in the reservoir (13) drops further. During light load or constant throttle situations, as the throttle is slowly opened or held steady, the fuel is able to drain through the bottom slot (14) faster than it is lifted, and the fuel accelerator circuit contributes minimally to the overall AFR mixture. This is desirable as the primary fuel delivery surface (11) of the metering rod (10) is well suited towards these conditions.

Figure 6:
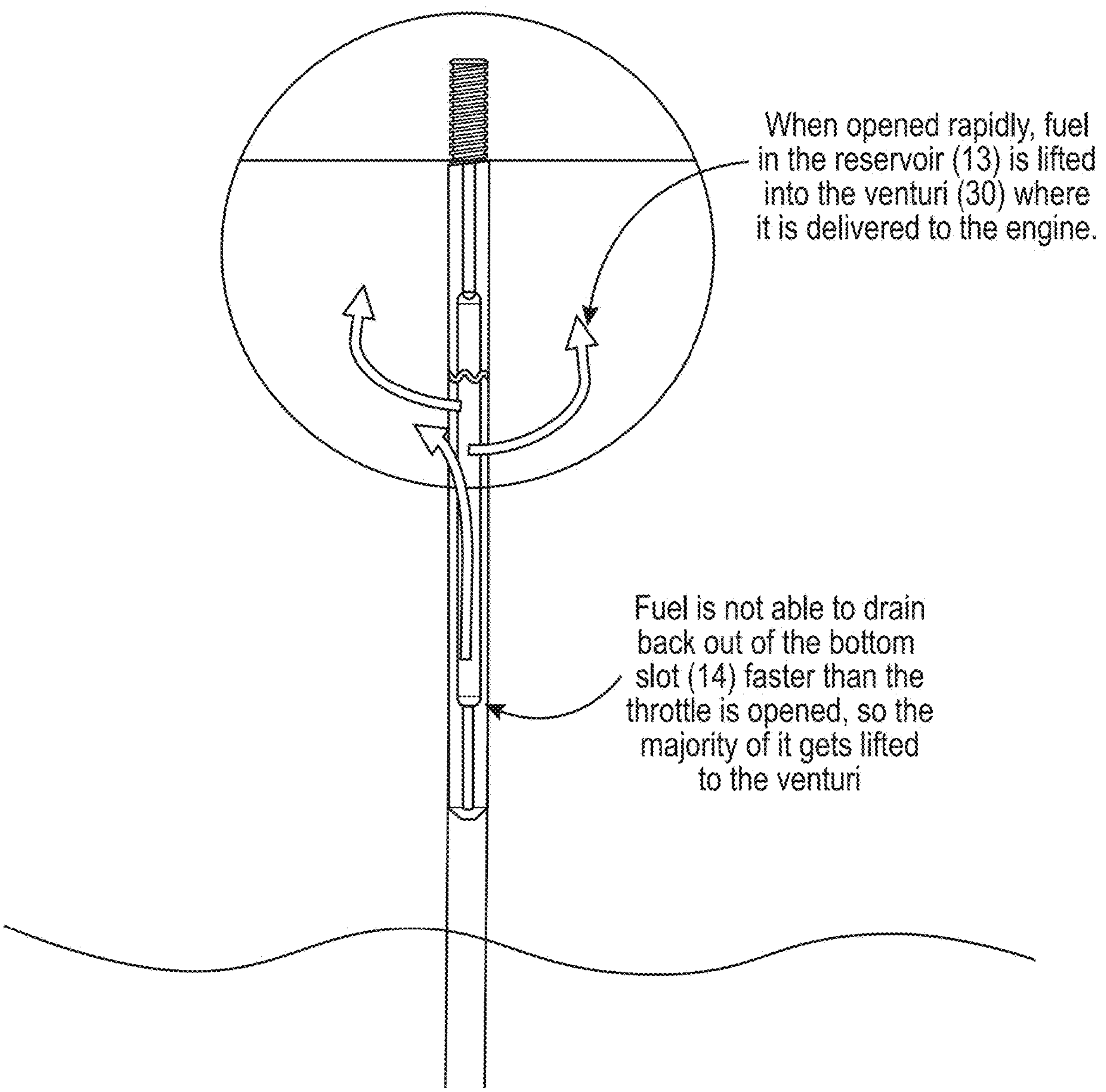
FIG. 6 is a graphic illustration of a sub-operation of the metering rod according to the present disclosure. The illustration includes a representation of the fuel delivery during a high load situation. As a throttle is quickly opened, fuel is not able to drain through a bottom slot faster than it is physically lifted by the upward motion of the bottom of the reservoir. As a result, the engine is provided a brief increase in fuel delivery to aid in acceleration until sufficient engine rotational speed, or RPM, is reached to maintain optimum AFR off the flat tapered side of the metering rod, which serves as the primary fuel delivery surface.
Figure 7:
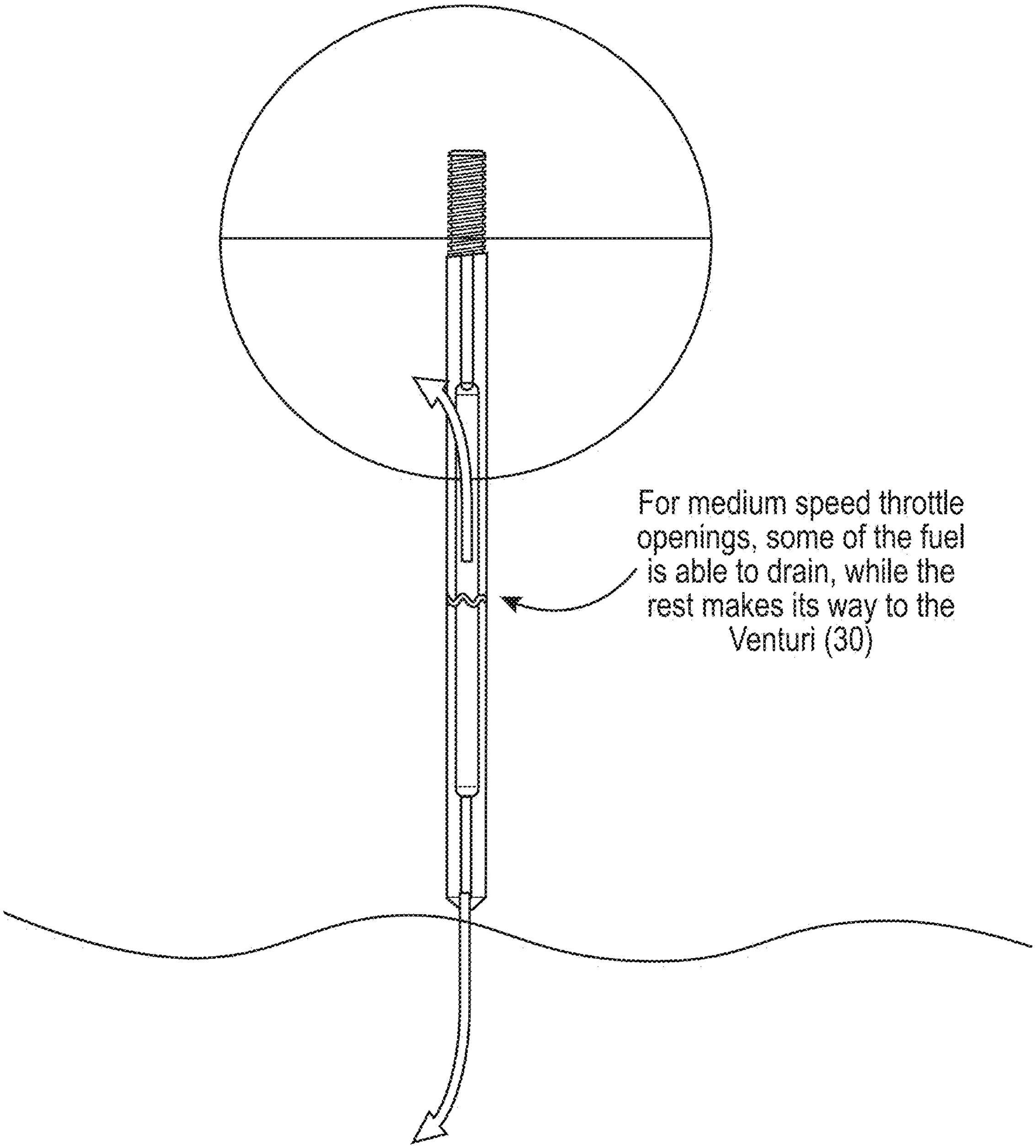
FIG. 7 is a graphic illustration of a sub-operation of a metering rod according to the present disclosure. The illustration includes a representation of fuel delivery during a medium load situation. For these intermediate rates of throttle opening, such as rolling the throttle open, some amount of fuel will drain through a bottom slot, giving a smaller additional amount of fuel.

During high load situations, as the throttle is quickly opened, fuel is not able to drain through the bottom slot (13) faster than it is lifted (FIG. 6). As a result, the engine gets a brief period of increased fuel delivery to aid in acceleration until sufficient RPM is reached to maintain optimum AFR off the primary fuel delivery surface alone. Once the fuel from the reservoir (13) has been utilized, the vacuum on the bottom slot (14) is not enough to draw any appreciable amount of fuel, and the rod (10) again acts like a traditional (non-accelerator circuit feature) metering rod.

For intermediate rates of throttle opening, some amount of fuel will drain through the bottom slot (14), providing a smaller additional amount of fuel. Thus, sizing of the bottom slot (14) relative to the reservoir (13) is desired in ensuring that the proper amount of fuel is delivered based on the rate of throttle opening. Additionally, it is important to allow for adequate refilling for repeated throttle openings. Starting and end positions of the reservoir (13) may be designed and may correspond with desired throttle positions for which the accelerator fuel circuit (12, 13, 14) may be active and may be designed to provide the desired maximum volume of fuel to be delivered for a given application or installation.

The benefits of this improved metering rod and related technology manifest themselves as notably increased throttle response, more immediate power at all engine speeds, increased low-end power, and the ability to further tune the fuel accelerator for increased top end power without sacrificing any bottom end power.

Unless otherwise defined, all technical and scientific terms used herein have the same meaning as commonly understood by one of ordinary skill in the art to which this disclosure belongs. Although methods and materials similar to or equivalent to those described herein can be used in the practice or testing of the metering rod with accelerator fuel delivery, suitable methods and materials are described above. All publications, patent applications, patents, and other references mentioned herein are incorporated by reference in their entirety to the extent allowed by applicable law and regulations. The metering rod with accelerator fuel delivery may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A fuel delivery system for use in an internal combustion engine, the fuel delivery system comprising:

- a carburetor comprising a metering rod having a leading side and a trailing side and wherein the metering rod comprises a fuel accelerator circuit located proximal the leading side of the metering rod, the fuel accelerator circuit comprising:
- a first slot located proximal the first end of the metering rod;
- a second slot located proximal the second end of the metering rod; and
- a reservoir located between the first and second slots, the reservoir being connected to the first slot and the second slot so that fluid may collect in the reservoir and flow to the first and second slots.

2. The fuel delivery system of claim 1 wherein the metering rod comprises a generally round, D-shaped cross-section defining a generally flat surface located proximal the trailing side of the metering rod.

3. The fuel delivery system of claim 2 wherein the metering rod comprises a taper portion located between the first end and the second end.

4. The fuel delivery system of claim 2 wherein the fuel accelerator circuit is located angularly from the leading side between approximately forty-five degrees (45°) and approximately one hundred thirty-five degrees (135°).

5. A metering rod comprising a generally round D-shaped cross-section and having a first end and a second opposite end, the metering rod further having a leading side and an opposite trailing side and wherein the trailing side comprises a generally flat surface and wherein the leading side of the metering rod includes a fuel accelerator circuit comprising: a first slot located proximal the first end of the metering rod, a second slot located proximal the second end of the metering rod, and a reservoir located between the first and second slots and in fluid communication therewith; and wherein the fuel accelerator circuit is located opposite the flat side of the metering rod.

6. A carburetor comprising a metering rod comprising a generally round D-shaped cross-section and having a first end and a second opposite end, the metering rod further having a leading side and an opposite trailing side and wherein the trailing side comprises a generally flat surface and wherein the leading side includes a fuel accelerator circuit comprising: a first slot located proximal the first end of the metering rod, a second slot located proximal the second end of the metering rod, and a reservoir located between the first and second slots and in fluid communication therewith.

* * * * *